United States Patent
Jones et al.

(10) Patent No.: US 9,514,890 B2
(45) Date of Patent: Dec. 6, 2016

(54) LOW ENERGY MILLING TO PRODUCE FLAKE POWDERS

(71) Applicant: Kemet Electronics Corporation, Simpsonville, SC (US)

(72) Inventors: Brady A. Jones, Carson City, NV (US); Matthew W. Dufur, Mound House, NV (US); James Allan Fife, Mound House, NV (US)

(73) Assignee: KEMET Electronics Corporation, Simpsonville, SC (US)

( * ) Notice: Subject to any disclaimer, the term of this patent is extended or adjusted under 35 U.S.C. 154(b) by 226 days.

(21) Appl. No.: 14/205,698

(22) Filed: Mar. 12, 2014

(65) Prior Publication Data

US 2014/0268494 A1  Sep. 18, 2014

Related U.S. Application Data

(60) Provisional application No. 61/779,242, filed on Mar. 13, 2013.

(51) Int. Cl.
| | |
|---|---|
| *H01G 9/042* | (2006.01) |
| *B02C 17/00* | (2006.01) |
| *C22C 27/02* | (2006.01) |
| *H01G 9/15* | (2006.01) |
| *H01G 9/00* | (2006.01) |
| *C22C 30/00* | (2006.01) |
| *C22C 1/04* | (2006.01) |

(52) U.S. Cl.
CPC .............. *H01G 9/042* (2013.01); *B02C 17/00* (2013.01); *C22C 1/045* (2013.01); *C22C 27/02* (2013.01); *C22C 30/00* (2013.01); *H01G 9/0029* (2013.01); *H01G 9/15* (2013.01); *Y10T 428/12014* (2015.01)

(58) Field of Classification Search
None
See application file for complete search history.

(56) References Cited

U.S. PATENT DOCUMENTS

| | | | |
|---|---|---|---|
| 3,647,415 A * | 3/1972 | Yano | ..................... B22F 1/0055 429/23 |
| 4,441,927 A | 4/1984 | Getz et al. | |
| 4,555,268 A | 11/1985 | Getz | |
| 4,740,238 A | 4/1988 | Schiele | |
| 4,940,490 A * | 7/1990 | Fife | ......................... C22C 1/045 361/311 |
| 5,211,741 A | 5/1993 | Fife | |
| 5,217,526 A * | 6/1993 | Fife | ......................... B22F 1/004 75/228 |
| 5,261,942 A * | 11/1993 | Fife | ...................... H01G 9/0525 75/342 |
| 5,580,367 A | 12/1996 | Fife | |

(Continued)

FOREIGN PATENT DOCUMENTS

WO    WO 00-69588    11/2000

OTHER PUBLICATIONS

ISA/KR; International Search Report and Written Opinion; I.A. No. PCT/US2014/024202; Applicant: Kemet Electronics Corporation; Date of mailing: Jul. 3, 2014.

*Primary Examiner* — Dion R Ferguson
(74) *Attorney, Agent, or Firm* — Joseph T. Guy; Perkins Law Firm, LLC (57) ABSTRACT

A method for increasing surface area of a valve metal particle is provided as is an improved valve metal particle provided thereby. The method includes charging a mill apparatus with a valve metal powder and a media wherein the media has an average diameter of at least 0.01 cm to no more than 0.3175 cm. The valve metal powder is then milled at an average kinetic energy of no more than 3,000 ergs per media particle to obtain a milled powder.

52 Claims, 4 Drawing Sheets

10

12

14

(56) References Cited

U.S. PATENT DOCUMENTS

| | | | |
|---|---|---|---|
| 6,402,066 B1* | 6/2002 | Habecker | B22F 1/0055 241/21 |
| 7,777,129 B2 | 8/2010 | Kayama et al. | |
| 2002/0179753 A1 | 12/2002 | Habecker et al. | |
| 2004/0252445 A1* | 12/2004 | Wang | H01G 9/0525 361/508 |
| 2011/0149477 A1 | 6/2011 | Summey et al. | |
| 2011/0239424 A1* | 10/2011 | Shibuya | H01G 9/0032 29/25.41 |
| 2012/0106031 A1* | 5/2012 | Vilc | H01G 2/10 361/525 |
| 2012/0257329 A1* | 10/2012 | Biler | H01G 9/012 361/528 |
| 2013/0155581 A1* | 6/2013 | McHugh | B22F 9/28 361/509 |

* cited by examiner

LOW ENERGY MILLING TO PRODUCE FLAKE POWDERS

CROSS-REFERENCE TO RELATED APPLICATIONS

The present invention claims priority to pending U.S. Provisional Patent Application No. 61/779,242 filed Mar. 13, 2013.

BACKGROUND

Prior art valve metal, and particularly tantalum, flake powder for use in fabricating the anodes of electrolytic capacitors have been produced by mechanically milling powder in ball mills, vibratory ball mills, attritor mills and the like for the purpose of increasing the specific surface area of the particles. This approach has been broadly practiced and described in numerous patents such as U.S. Pat. Nos. 5,580,367; 4,940,490; 5,211,741; 5,261,942; 4,441,927; 4,555,268; 4,740,238 and 3,647,415 each of which is incorporated herein by reference.

Valve metal flakes made by prior art methods have been characterized as having a low to medium level of charge density, as typically reported in micro-farad volts per gram (CV/g), and the levels were considered to be the limit achievable by mechanical milling. It has been considered in the industry that mechanical deformation in steel milling machines can not be expected to achieve flakes with CV/g greater than about 20,000 micro-farad volts per gram of valve metal, preferably of tantalum, with a Brunauer-Emmett-Tell (BET) surface area of more than about 1 $M^2/g$.

Milling is a very advanced art and those of skill in the art have considered the valve metal powders achieved by milling to have reached their pinnacle. While those of skill in the art have considered the mechanical limit to have been reached it has been surprisingly found, through diligent research, that high charge density powder can be achieved by producing high specific surface area with lower milling energy which is contrary to the expectations in the art. Under specific conditions, as set forth herein, a lower milling energy can actually achieve a high surface area with lower surface impurity thereby leading to a material which exceeds the properties previously thought achievable by mechanical milling.

SUMMARY

It is an object of the invention to provide a new method for making high surface area valve metal, preferably tantalum, powders that achieve the requisite specific surface area without introducing unacceptable levels of metallic impurities; specifically, without causing unacceptably high levels of iron, nickel, chromium, silicon and zirconium.

A particular advantage is the ability to utilize relatively low value powder, such as one with low charge density, and to increase the value by milling to a higher charge density.

These and other advantages, as will be realized, are provided in a method for increasing surface area of a valve metal particle. The method includes charging a mill apparatus with a valve metal powder and a media wherein the media has an average diameter of at least 0.01 cm to no more than 0.3175 cm. The valve metal powder is then milled at an average kinetic energy of no more than 3,000 ergs per media particle to obtain a milled powder.

Yet another embodiment is provided in a valve metal powder with a CV/g of at least 30,000 micro-farad volts per gram; a BET surface area of greater than 4 $M^2/g$; and an aspect ratio of at least 3.

Yet another embodiment is provided in a capacitor with an anode comprising a valve metal powder wherein the valve metal powder has a CV/g of at least 180,000 micro-farad volts per gram, a BET surface area of greater than 4 $M^2/g$ and an aspect ratio of at least 3. A dielectric is on the anode and a cathode is on the dielectric.

DESCRIPTION

The present invention is directed to an improved valve metal flake, and particularly tantalum flake, which has a higher CV/g and a higher surface area than previously considered achievable by mechanical milling. The present invention is also directed to an improved milling method relying on small media and low energies which was previously considered incapable of forming suitable flake. The present invention is also related to an improved capacitor comprising the valve metal as the anode.

The present invention is directed to improved valve metal particles, particularly tantalum particles, produced by mechanical ball milling, attritor milling, vibratory ball milling, or roll milling using very small media. The media preferably has an average diameter of at least 0.001 cm to no more than 0.3175 cm. More preferably the media has an average diameter of at least 0.025 cm to 0.1 cm and even more preferably the media has an average diameter of at least 0.025 cm to 0.030 cm.

The milling is done with low milling energies such as achieved at an RPM of an attritor mill of less than 120 RPM. The valve metal particles are milled to high BET surface area over several hours. The resultant particles have a BET surface area which is 2 to 4 times higher than the BET surface area of the particles fed to the mill and the surface impurities of the resultant particles are maintained at low levels. In one embodiment the BET of a powder fed to the improved milling process was increased from about 2 to about 7 square meters per gram. It Is preferable that the valve metal flakes are milled to have a BET of greater than 4 $M^2/g$, more preferably greater than 5 $M^2/g$, even more preferably greater than 6 $M^2/g$, even more preferably at least 7 $M^2/g$, even more preferably at least 8 $M^2/g$ and even more preferably at least 9 $M^2/g$. The valve metal particles preferably have a low level of metallic impurity and preferably no more than 30 ppm metal other than the valve metal. More preferably the valve metal particles have no more than 30 ppm of iron, nickel and chromium combined and more importantly no more than 30 ppm of iron, nickel, chromium, silicon and zirconium combined. Carbon is also preferably low while the carbon content was lowered from about 23 micrograms per square meter of particle surface to less than about 18 micrograms per square meter.

The valve metal powder has a CV/g of preferably at least 180,000 micro-farad volts per gram of valve metal, preferably of tantalum, and even more preferably at least 200,000 micro-farad volts per gram of valve metal, preferably of tantalum, and even more preferably at least 250,000 micro-farad volts per gram of valve metal, preferably of tantalum. Low CV/g powders, such as less than 30,000 micro-farad volts per gram can be treated to significantly increase the CV/g thereby significantly increasing the value of the powder. More preferably, powders with less than 50,000 micro-farad volts per gram can be treated to significantly increase the CV/g and even more preferably, powders with less than 100,000 micro-farad volts per gram can be treated to significantly increase the CV/g.

The kinetic energy applied to the media particles in the mill can be defined quantitatively as $$KE = \frac{1}{2} \cdot \rho_{Media} \cdot v_{Media} \cdot V^2.$$

where $\rho_{Media}$ is the density of the media material in grams per cubic centimeter, $v_{Media}$ is the volume of an average media object, for instance a spherical media ball, in cubic centimeters, and V is the maximum speed of the stirring mechanism of the mill that imparts kinetic energy to the media objects during the milling operation expressed as centimeters per second.

As an example of how to perform this calculation consider an attritor mill configuration wherein a vertical cylindrical tank is filled with 0.1 cm diameter spherical steel media which are propelled by a stirring mechanism composed of horizontally positioned metal arms of length, L, attached to and rotating about a centrally positioned vertical drive shaft. The tip speed, V, of such rotating metal arms, which would be the maximum stirring speed of the milling mechanism, is calculated as $$V = L \cdot RPM \cdot \frac{2 \cdot \pi}{60}$$

where the length of the stirring arms, L, is given in centimeters and RPM is the rotations per minute of the drive shaft. In this example the final calculation of the average kinetic energy of an average media object would use the density of the spherical steel media $\rho_{Media}$ equal to about 8 grams per cubic centimeter (the typical density of steel), and $v_{Media}$ would be set equal to $$\frac{4}{3} \cdot \pi \cdot r^3$$

where r is the average radius of the steel spheres in centimeters. If, for this example, a diameter of the media sphere is 0.1 cm is assumed with a stirring arm length of 10 centimeter and the mill RPM is 200 the kinetic energy per sphere is $$\frac{1}{2} \cdot 8 \cdot \frac{4}{3} \cdot \pi \left(\frac{0.1}{2}\right)^3 \cdot \left(\frac{10 \cdot 200 \cdot 2 \cdot \pi}{60}\right)^2 = 91.87 \text{ ergs.}$$

Milling energy above about 3,000 ergs per milling media sphere cause impurities to increase which is undesirable. More preferably the milling energy is less than about 1,000 ergs and even more preferably less than 100 ergs. A milling energy of no more than 5 ergs per milling media sphere is particularly suitable with no more than 2 ergs being more desirable and no more than 1 erg being most desirable.

Prior art methods for milling tantalum powders relied on the use of high mass, metallic milling media to achieve a high energy. The size of the milling media was chosen to take advantage of the large mass and correspondingly large momentum of the media to create high kinetic energy during the high energy processing in the various mills used. The need for what is termed "high energy" mills to create enough surface area during the milling to enable high micro-farad volts per gram of tantalum powders was considered necessary with mulitples of 3,000 ergs, and usually well over 10,000 ergs, being considered necessary to achieve adequate results. Our experimentation to emulate these processes shows that, achieving high micro-farad volts per gram of tantalum by these methods surprisingly causes surface contamination by the materials of construction of the mill and most notably by the milling media.

The media is preferably chosen from the group consisting of spherical steel, zirconia, yttria stabilized zirconia, 440 stainless steel, glass, tungsten carbide, tantalum, niobium, tantalum nitride, niobium nitride, tantalum carbide and mixtures thereof. The mixtures may include structured materials such as a core shell structure with an inner material which is softer and an outer material which is harder. An example of media made of mixed materials would be a tantalum sphere coated with tantalum nitride.

The particles being milled to flake are preferably valve metal particles selected from the group consisting of tantalum, niobium, tungsten, titanium, aluminum and alloys thereof. Tantalum is the preferred valve metal.

Figure 4:
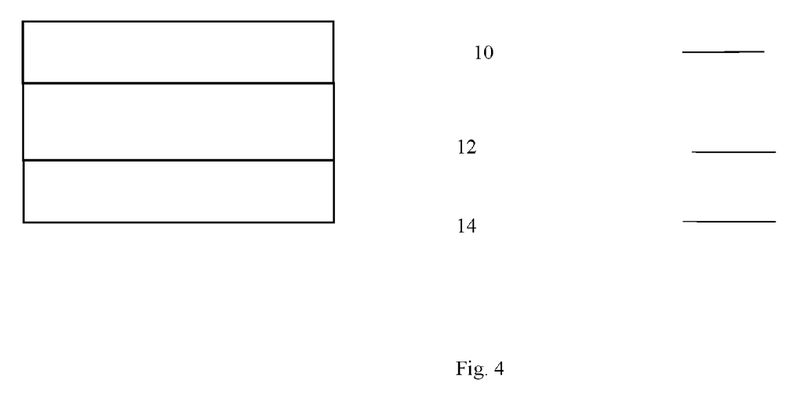

The flakes preferably have an aspect ratio, determined as the ratio of the diameter with the same surface area as a flake to the thickness, of at least 3 to about 300. More preferably, the flake has an aspect ratio of at least 10 and more preferably at least 100. An aspect ratio of about 200 to about 300 is particularly preferred. The flaked niobium powder permits enhanced surface area due to its morphology The valve metal powder described herein is particularly suited for use as the anode, 10, in a capacitor as illustrated schematically in FIG. 4. The valve metal anode is preferably oxidized to form a dielectric, 12, and the dielectric is over coated with a conductor, 14, as the cathode as well known in the art.

COMPARATIVE EXAMPLE 1

A sample of metallurgical grade tantalum powder with a BET of 0.18 $M^2$/g was loaded into an 1-S attritor mill made by Union Process of Akron Ohio with stirring arms 9.842 cm (3.875 inch) long. The mill was operated with ethyl alcohol as a milling lubricant using 0.4762 cm (0.1875 inch) equivalent diameter 440 stainless steel spheres as milling media in accordance with standard industrial practice. The mill was run at 400 RPM for 180 minutes thereby imparting a kinetic energy of over 38,600 ergs. The milled product was removed from the mill and acid leached in HCl and HF acids to determine the residual Fe, Ni, Cr, Si and Zr from the wear of the mill. This technique takes advantage of the fact that tantalum is practically unaffected by the exposure to strong mineral acids which readily dissolve any free 440 stainless steel particles. The bulk analysis from this acid cleaned sample is shown in Table 1. These levels are generally considered in the industry to be too high for a commercially useful tantalum capacitor powder. The reason the steel impurities are retained after acid treatment is believed to indicate that steel particles were beaten into the surface of the tantalum which then acted to protect the steel from attack by the acids.

COMPARATIVE EXAMPLE 2

A sample of NT 40 tantalum powder available from Kemet Electronics of Mound House Nevada with a BET of 1.44 $M^2/g$ was loaded into the same mill as used in Comparative Example 1 and milled using ethyl alcohol using 0.4762 cm (0.1875 inch) diameter 440 stainless steel spheres for 3600 minutes at 350 RPM in accordance with standard industry practice thereby imparting a kinetic energy of over 29,600 ergs. The product was leached in HCl and HF acids as in Example 1. The bulk analysis of the product is shown in Table 1. These levels are generally considered in the industry to be too high for a commercially useful tantalum capacitor powder.

COMPARATIVE EXAMPLE 3

A sample of NT 120 tantalum powder with a BET of 2.23 $M^2/g$ was loaded into the same attritor mill with 0.317 cm (0.125) inch diameter 440 stainless steel spheres in ethyl alcohol and run for 120 minutes at 250 rpm thereby achieving a kinetic energy of over 4,400 ergs. The product was acid leached as before and analyzed with results shown in Table 1. While these levels are an improvement they would still be considered out of the specification limits for commercially available tantalum powders with comparable BET.

TABLE 1

| Comp. Example | Milling Time (min) | Mill Speed (RPM) | Media | BET ($m^2/g$) | Fe (ppm) | Ni (ppm) | Cr (ppm) | Zr (ppm) |
|---|---|---|---|---|---|---|---|---|
| 1 | 180 | 400 | .476 cm 440 stainless steel | 1.6 | 1000 | 53 | 620 | <2 |
| 2 | 3600 | 350 | .476 cm 440 stainless steel | 2.06 | 1000 | 191 | 1000 | <2 |
| 3 | 120 | 120 | .317 cm 440 stainless steel | 3.08 | 44 | 14 | 16 | <2 |

While improvements were made in reducing the surface density of impurities in high BET tantalum powders through increasing the BET of the powder loaded into the mill the prior art process could not achieve BET greater than about 2 without adding unacceptable impurity levels.

In order to find a new method to achieve high specific surface area tantalum powder with acceptable levels of impurities we investigated a radical departure from the prior art methods by reducing the energy intensity within the mill during milling. It has long been considered necessary to increase milling energy to achieve increased surface area.

INVENTIVE EXAMPLE 1

The same attritor mill as above was loaded with NT 120 tantalum powder having a BET of 2.23 $M^2/g$. The stainless steel spheres were replaced with low mass zirconia spheres having a diameter of 0.05 cm. These milling spheres were 359 times smaller in mass than the spheres used in Comparative Example 3. In addition to reducing the mass of the spheres the mill RPM was reduced to 100 RPM thereby inputting less than 2 ergs of kinetic energy. With this combination of extremely low mass media and low power input to the milling process a milling time of 1800 minutes was used. With these radically different materials and conditions the final product, after leaching in HCl and HF acids, was analyzed with the bulk results shown in Table 2. These surface concentrations of impurities would generally be usable for commercial tantalum capacitors.

INVENTIVE EXAMPLE 2

The same attritor mill as above was loaded with NT 120 tantalum powder with a BET of 2.23 $M^2/g$. The stainless steel spheres of prior art were replaced with low mass zirconia spheres having a diameter of 0.05 cm. These milling spheres were 359 times smaller in mass than the spheres used in Comparative Example 3. In addition to reducing the mass of the spheres the RPMs was reduced to 90 RPM inputting less than 2 ergs of kinetic. With this combination of extremely low mass media and low power input to the milling process a milling time of 1800 minutes was used. With these radically different materials and conditions the final product, after leaching in HCl and HF acids, was analyzed with bulk results shown in Table 2. These surface concentrations of impurities would generally be usable for commercial tantalum capacitors.

It is shown in these examples that the prior art process using massive spheres with high input power resulted in high energy milling that could not achieve a BET greater than 2 $M^2/g$ without imparting unacceptable levels of impurities. The inventive low energy process has achieved a BET of greater than 4 or 5 $M^2/g$ with acceptable levels of impurities.

TABLE 2

| Invention Example | Milling time | Mill rpm | Media | BET | Fe | Ni | Cr | Zr |
|---|---|---|---|---|---|---|---|---|
| 1 | 1800 minutes | 100 | 0.5 mm zirconia | 5.29 | 1 | 0 | 0 | 51 |
| 2 | 1800 minutes | 90 | 0.5 mm zirconia | 4.89 | 1 | 0 | 0 | 28 |

INVENTIVE EXAMPLE 3

Three samples of tantalum powder were prepared using the same general procedure as Invention Example 2, except that a range of different combinations of milling RPMs and milling times were used. These samples were thermally agglomerated at 800° C. and deoxidized by magnesium at 800° C. using procedures common in tantalum powder industry. The tantalum powder was converted into sintered anode slugs and evaluated electrically as capacitor anodes to verify the functional capacitance achievable. The milling time and RPMs used for the manufacture of these powders, and the electrical test results for anodes made from the three samples, are shown in comparison to the non-milled starting material fed to the mill in Table 3. At 60 RPM less than 1 erg of kinetic energy was imparted on the powder per particle and at 100 RPM less than 2 ergs of kinetic energy was imparted on the powder per particle.

TABLE 3

| Time (min) | Speed (RPM) | BET (m²/g) | FE (ppm) | Ni (ppm) | Cr (ppm) | Zr (ppm) | 1100° C. Sinter | | 1150° C. Sinter | |
|---|---|---|---|---|---|---|---|---|---|---|
| | | | | | | | Charge CV/g (µF-V/g) (50 Hz) | Wet Leakage nA/CV (nA/µF-V) (50 Hz) | Charge CV/g (µF-V/g) (50 Hz) | Wet Leakage nA/CV (nA/µF-V) (50 Hz) |
| N/A | N/A | 2.10 | <1 | <3 | <1 | 2 | N/A | N/A | N/A | N/A |
| 2700 | 60 | 5.15 | 9 | 13 | 2 | 23 | 208,500 | 1.97 | 160,300 | 3.45 |
| 3000 | 60 | 5.99 | 1 | <3 | <1 | 83 | 213,100 | 2.12 | 168,700 | 2.86 |
| 2400 | 100 | 6.92 | 9 | 17 | 2 | 121 | 215,000 | 2.29 | 169,300 | 4.22 |

The inventive examples have very high values for micro-farad volts per gram and acceptable leakage values in all cases. The Micro-farad volts per gram levels of greater than 200,000 are achievable.

INVENTIVE EXAMPLE 4

The same attritor mill as used for the above examples was loaded with 3.86 Kgs of tantalum powder made by Kemet Blue Powder in Mound House Nevada with a BET specific surface area of 2.09 M²/g. The mill was also loaded with 50 Kgs of tantalum spheres, with an average diameter of between 0.01 cm and 0.03 cm, and covered with ethyl alcohol. These very small tantalum spheres were used as the milling media for the grinding process. The mill was run at 60 RPM for 1020 minutes and the product removed from the mill and cleaned by acid leaching in hydrochloric, nitric and hydrofluoric acids as is typical of the acid treatment for tantalum powders in the industry. The kinetic energy was less than 0.5 erg per particle. The tantalum flake produced was physically and chemically analyzed producing the bulk results presented in Table 4.

TABLE 4

| Time (min) | Speed (RPM) | BET (m²/g) | FE (ppm) | Ni (ppm) | Cr (ppm) | Zr (ppm) |
|---|---|---|---|---|---|---|
| N/A | N/A | 2.09 | <1 | <3 | <1 | <2 |
| 1020 | 60 | 5.54 | 3 | <3 | <1 | <2 |

INVENTIVE EXAMPLE 5

The same attritor mill as used in Inventive Example 4 was loaded with same tantalum powder as used in Inventive Example 4 and with the same very small spherical tantalum media and ethyl alcohol. The mill was run at 70 RPM for 1260 minutes thereby imparting less than 0.5 ergs per particle. The product was acid cleaned as in Inventive Example 4. The tantalum flake produced was physically and chemically analyzed with the bulk results presented in Table 5.

TABLE 5

| Time (min) | Speed (RPM) | BET (m²/g) | FE (ppm) | Ni (ppm) | Cr (ppm) | Zr (ppm) |
|---|---|---|---|---|---|---|
| N/A | N/A | 2.09 | <1 | <3 | <1 | <2 |
| 1260 | 70 | 6.08 | 2 | <3 | <1 | <2 |

INVENTIVE EXAMPLE 6

The same attritor mill as used in Inventive Example 4 was loaded with the same tantalum powder used in Inventive Example 4 and with the same very small spherical tantalum media and ethyl alcohol. The mill was run at 70 RPM for 1500 minutes. The product was acid cleaned as in Inventive Example 4. The tantalum flake produced was physically and chemically analyzed with bulk results presented in Table 6.

TABLE 6

| Time (min) | Speed (RPM) | BET (m²/g) | FE (ppm) | Ni (ppm) | Cr (ppm) | Zr (ppm) |
|---|---|---|---|---|---|---|
| N/A | N/A | 2.09 | <1 | <3 | <1 | <2 |
| 1500 | 70 | 7.06 | 1 | <3 | <1 | <2 |

Figure 1:
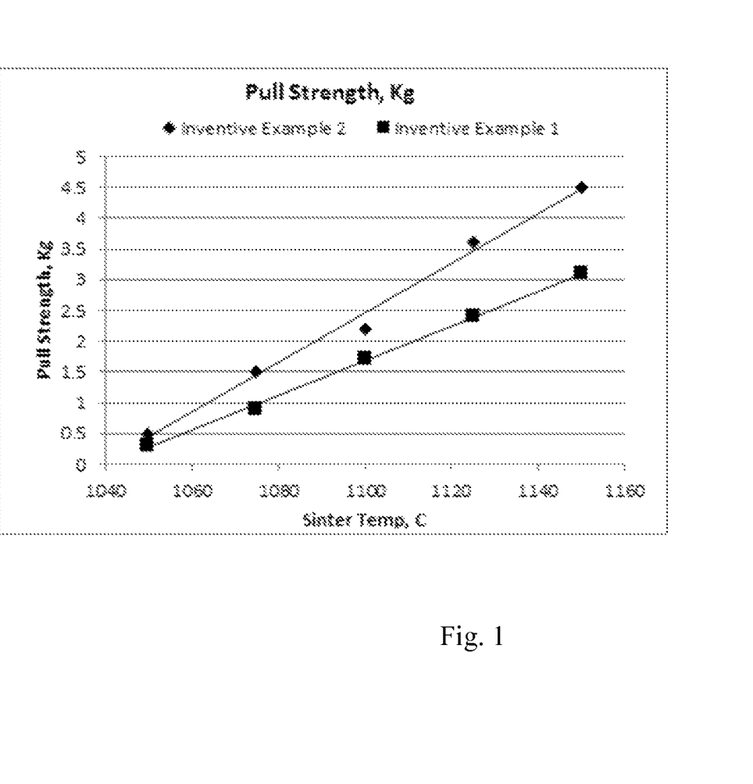
FIG. 1 is a graphical representation of an advantage provided by an embodiment of the invention.
Figure 2:
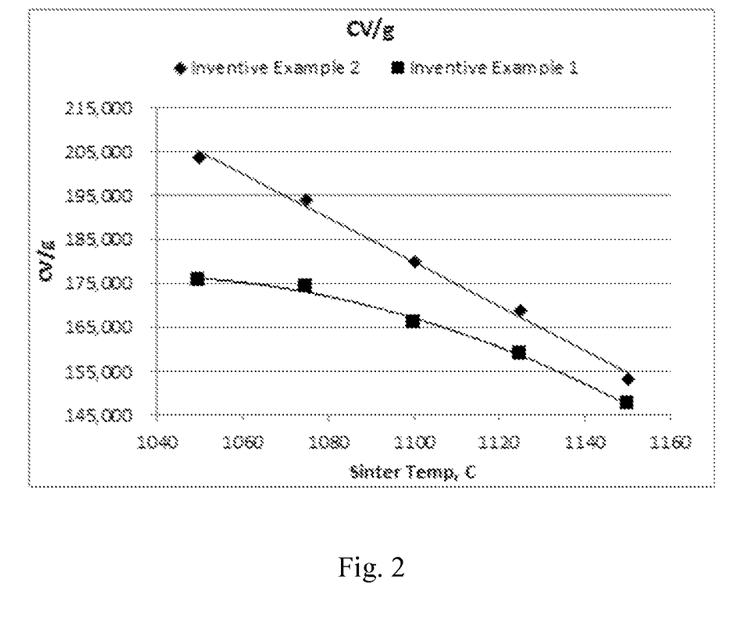
FIG. 2 is a graphical representation of an advantage provided by an embodiment of the invention.
Figure 3:
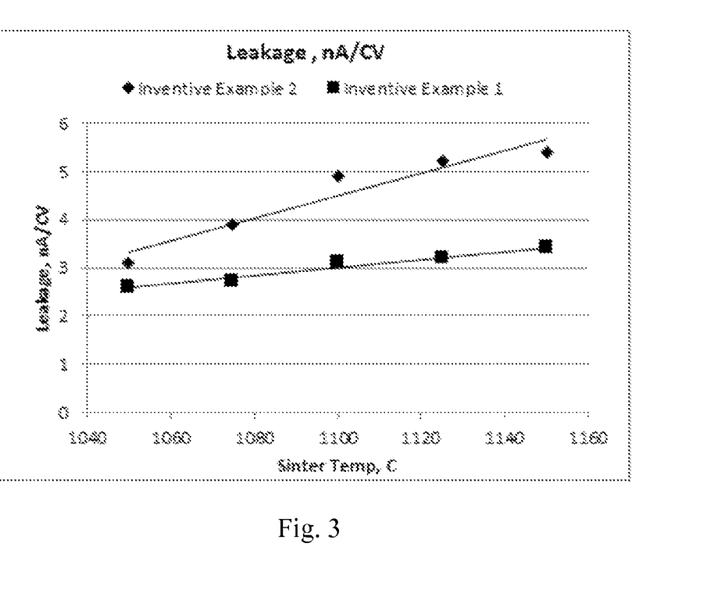
FIG. 3 is a graphical representation of an advantage provided by an embodiment of the invention and FIG. 4 is a schematic representation of an embodiment of the invention.

To determine the electrical properties powder from Inventive Examples 1 and 2 were binderized with a commercial organic binder and anodes were pressed using a commercial style press to form anodes which were approximately 0.24 cm×0.22 cm×0.05 cm at a density of 6.0 g/cm³. A 0.03 cm Ta wire was inserted during the pressing operation for electrical connection. The anodes were delubed at approx. 400° C. and then vacuum sintered at temperatures ranging from 1050 to 1150° C. Lead wire pull strength was measured after sintering by fixturing the anode and pulling the wire out of the anode with a Chatillon LTCM-6. Anodes were then formed in a solution of phosphoric acid and water (350 ohm-cm) at 83° C. and 18V. Anodes were then tested for capacitance, with zero bias at 50 Hz and for leakage current at 70% of the formation voltage. The pull strength results are in provided in FIG. 1, the CV/g results are provided in FIG. 2 and the leakage is provided in FIG. 3.

The invention has been described with particular reference to preferred embodiments without limit thereto. One of skill in the art would realize additional embodiments and improvements which are not specifically enumerated but which are within the scope of the invention as specifically set forth in the claims appended hereto.

The invention claimed is:

1. A capacitor comprising as an anode
   a tantalum powder formed by the method of:
   charging a mill apparatus with a valve metal powder and
   a media wherein said media has an average diameter of at least 0.01 cm to no more than 0.3175 cm; and
   milling at an average kinetic energy of no more than 3,000 ergs per media particle to obtain a milled powder
   wherein said milled powder has a BET surface area of greater than 4 M²/g and an aspect ratio of at least 3 and no more than 30 ppm metallic impurity.

2. The capacitor of claim 1 comprising milling at an average kinetic energy of no more than 1,000 ergs per media particle.

3. The capacitor of claim 2 comprising milling at an average kinetic energy of no more than 100 ergs per media particle.

4. The capacitor of claim 3 comprising milling at an average kinetic energy of no more than 5 ergs per media particle.

5. The capacitor of claim 4 comprising milling at an average kinetic energy of no more than 2 ergs per media particle.

6. The capacitor of claim 5 comprising milling at an average kinetic energy of no more than 1 erg per media particle.

7. The capacitor of claim 1 wherein said media comprises a material selected from the group consisting of steel, zirconia, yttria stabilized zirconia, 440 stainless steel, glass, tungsten carbide, tantalum, niobium, tantalum nitride, niobium nitride, tantalum carbide and mixtures thereof.

8. The capacitor of claim 1 wherein said media is spherical.

9. The capacitor of claim 1 wherein said milled powder has a BET surface area of greater than 5 $M^2/g$.

10. The capacitor of claim 9 wherein said milled powder has a BET surface area of greater than 6 $M^2/g$.

11. The capacitor of claim 10 wherein said milled powder has a BET surface area of greater than 7 $M^2/g$.

12. The capacitor of claim 11 wherein said milled powder has a BET surface area of greater than 8 $M^2/g$.

13. The capacitor of claim 12 wherein said milled powder has a BET surface area of greater than 9 $M^2/g$.

14. The capacitor of claim 1 wherein said milled powder has no more than 30 ppm impurity selected from iron, nickel and chromium.

15. The capacitor of claim 1 wherein said milled powder has no more than 30 ppm impurity selected from iron, nickel, chromium, silicon and zirconium.

16. The capacitor of claim 1 wherein said tantalum powder has a CV/g of less than 30,000 micro-farad volts per gram.

17. The capacitor of claim 16 wherein said tantalum powder has a CV/g of less than 50,000 micro-farad volts per gram.

18. The capacitor of claim 17 wherein said tantalum powder has a CV/g of less than 100,000 micro-farad volts per gram.

19. The capacitor of claim 1 wherein said milled powder has a CV/g of at least 180,000 micro-farad volts per gram.

20. The capacitor of claim 19 wherein said milled powder has a CV/g of at least 200,000 micro-farad volts per gram.

21. The capacitor of claim 20 wherein said milled powder has a CV/g of at least 250,000 micro-farad volts per gram.

22. The capacitor of claim 1 wherein said average kinetic energy is achieved at a rotation rate of a drive shaft of no more than 120 RPM.

23. The capacitor of claim 1 wherein said mill apparatus is selected from the group consisting of attitor mill, jar mill, vibratory ball mill and a horizontal stirred ball mill.

24. A capacitor comprising:
an anode comprising a tantalum powder comprising:
a CV/g of at least 180,000 micro-farad volts per gram;
a BET surface area of greater than 4 $M^2/g$;
no more than 30 ppm metallic impurity; and
an aspect ratio of at least 3;
a dielectric on said anode; and
a cathode on said dielectric.

25. The capacitor of claim 24 comprising no more than 30 ppm impurity selected from iron, nickel, chromium, silicon and zirconium.

26. The capacitor of claim 24 comprising no more than 30 ppm impurity selected from iron, nickel and chromium.

27. The capacitor of claim 24 wherein said tantalum powder is a milled powder with a BET surface area of greater than 5 $M^2/g$.

28. The capacitor of claim 27 wherein said milled powder has a BET surface area of greater than 6 $M^2/g$.

29. The capacitor of claim 28 wherein said milled powder has a BET surface area of at least 7 $M^2/g$.

30. The capacitor of claim 28 wherein said milled powder has a BET surface area of at least 8 $M^2/g$.

31. The capacitor of claim 28 wherein said milled powder has a BET surface area of at least 9 $M^2/g$.

32. The capacitor of claim 24 wherein said milled powder has a CV/g of at least 200,000 micro-farad volts per gram.

33. The capacitor of claim 32 wherein said milled powder has a CV/g of at least 250,000 micro-farad volts per gram.

34. A capacitor comprising as an anode a tantalum powder formed by the method of:
charging a mill apparatus with a tantalum powder and a media wherein said media has an average diameter of at least 0.01 cm to no more than 0.3175 cm;
milling at an average kinetic energy of no more than 3,000 ergs per media particle to obtain a milled powder;
herein said milled powder has no more than 30 ppm metallic impurity; and
an aspect ratio of at least 3.

35. The capacitor of claim 34 comprising milling at an average kinetic energy of no more than 1,000 ergs per media particle.

36. The capacitor of claim 35 comprising milling at an average kinetic energy of no more than 100 ergs per media particle.

37. The capacitor of claim 34 wherein said media comprises a material selected from the group consisting of steel, zirconia, yttria stabilized zirconia, 440 stainless steel, glass, tungsten carbide, tantalum, niobium, tantalum nitride, niobium nitride, tantalum carbide and mixtures thereof.

38. The capacitor of claim 34 wherein said media is spherical.

39. The capacitor of claim 34 wherein said milled powder has a BET surface area of greater than 4 $M^2/g$.

40. The capacitor of claim 39 wherein said milled powder has a BET surface area of greater than 5 $M^2/g$.

41. The capacitor of claim 40 wherein said milled powder has a BET surface area of greater than 6 $M^2/g$.

42. The capacitor of claim 41 wherein said milled powder has a BET surface area of greater than 7 $M^2/g$.

43. The capacitor of claim 42 wherein said milled powder has a BET surface area of greater than 8 $M^2/g$.

44. The capacitor of claim 43 wherein said milled powder has a BET surface area of greater than 9 $M^2/g$.

45. The capacitor of claim 34 wherein said milled powder has no more than 30 ppm impurity selected from iron, nickel and chromium.

46. The capacitor of claim 34 wherein said milled powder has no more than 30 ppm impurity selected from iron, nickel, chromium, silicon and zirconium.

47. The capacitor of claim 34 wherein said tantalum powder has a CV/g of less than 50,000 micro-farad volts per gram.

48. The capacitor of claim 47 wherein said tantalum powder has a CV/g of less than 100,000 micro-farad volts per gram.

49. The capacitor of claim 34 wherein said milled powder has a CV/g of at least 180,000 micro-farad volts per gram.

50. The capacitor of claim 49 wherein said milled powder has a CV/g of at least 200,000 micro-farad volts per gram.

51. The capacitor of claim 50 wherein said milled powder has a CV/g of at least 250,000 micro-farad volts per gram.

52. The capacitor of claim 34 wherein said average kinetic energy is achieved at a rotation rate of a drive shaft of no more than 120 RPM.

* * * * *